(12) United States Patent
Murakami et al.

(10) Patent No.: US 7,623,275 B2
(45) Date of Patent: Nov. 24, 2009

(54) IMAGE-READING APPARATUS

(75) Inventors: Ayumu Murakami, Abiko (JP); Takeshi Aoyama, Abiko (JP); Shoko Magata, Toride (JP); Yuichi Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 11/301,178

(22) Filed: Dec. 12, 2005

(65) Prior Publication Data

US 2006/0126132 A1    Jun. 15, 2006

(30) Foreign Application Priority Data

Dec. 13, 2004    (JP) .............................. 2004-360507

(51) Int. Cl.
*H04N 1/04* (2006.01)
(52) U.S. Cl. .................. 358/496; 358/474; 358/497
(58) Field of Classification Search ............... 358/496, 358/474, 497; 399/367, 380; 400/691
See application file for complete search history.

(56) References Cited

U.S. PATENT DOCUMENTS

| | | | | |
|---|---|---|---|---|
| 5,078,377 A | * | 1/1992 | DuBois ..................... | 271/4.01 |
| 5,534,989 A | * | 7/1996 | Rubscha et al. ............. | 399/381 |
| 6,027,109 A | | 2/2000 | Wada | |
| 7,536,148 B2 | * | 5/2009 | Fukumura .................. | 399/367 |

FOREIGN PATENT DOCUMENTS

| | | |
|---|---|---|
| JP | 08-223362 | 8/1996 |
| JP | 10-142851 | 5/1998 |

\* cited by examiner

*Primary Examiner*—Houshang Safaipour
(74) *Attorney, Agent, or Firm*—Canon USA Inc IP Div

(57) ABSTRACT

An original-transporting rotor configured to transport an original to an image-reading section and, after correcting skew of the original, to an original-transporting section capable of opening and closing relative to the image-reading section is provided. The original-transporting rotor is supported so as to define a variable angle with a light source provided in the image-reading section. When the original-transporting section is closed, an original-transporting mechanism is positioned by position regulating members.

8 Claims, 9 Drawing Sheets

IMAGE-READING APPARATUS

BACKGROUND OF THE INVENTION

1. Field of the Invention

The present invention relates to an image-reading apparatus reading an image of an original.

2. Description of the Related Art

Hitherto, some image-reading apparatuses such as a copying machine, a scanner, and a facsimile machine include an image-reading section and an original-transporting section transporting an original to the image-reading section. Also, some of the original-transporting sections are capable of opening and closing relative to the image-reading section.

In such an image-reading apparatus, in the case of reading an image of an original placed on a platen glass-plate, that is, in the case of so-called stationery reading, the original is read while moving an image-reading mechanism provided in the image-reading section in a sub-scanning direction. Whereas, in the case of reading an image of an original transported over the platen glass-plate by the original-transporting section, that is, in the case of so-called skimming, the image-reading mechanism is moved to a predetermined reading position so as to read the image of the original at the predetermined position.

Such an image-reading apparatus includes an automatic document feeder (herein after, referred to as ADF) having functions, e.g., separating a plurality of originals (sheets) sheet by sheet placed on an original-placing plate, transporting the original sheet to a predetermined image-reading section, and reading the original sheet at the image-reading section, in addition to flipping its front and back sides from each other and discharging it.

FIG. 7 is a sectional view of the structure of an example known image-reading apparatus. The image-reading apparatus mainly includes an ADF 100 and a reader section 200 constituting the image-reading section. The reader section 200 has a platen glass-plate 202 disposed on the upper surface of a main body 1 of the image-reading apparatus and a reading mover 201 provided therein, serving as an image-reading mechanism and including a light source 204, a first mirror 206, and so forth. The image-reading apparatus has a first reading mode (a stationery reading mode) and a second reading mode (a skimming mode). In the first reading mode, an original set by an operator on the platen glass-plate 202 is read by moving the reading mover 201 in an arrow direction indicated in the figure. In the second reading mode, the reading mover 201 is halted at a predetermined position, and an original set on the ADF 100 is read while transported over the platen glass-plate.

In the second reading mode in which the ADF 100 constituting the original-transporting section is used, after skew of the original is corrected by pushing its front end into contact with a regist roller pair 1101 (1101a and 1101b) and making a loop of the original, an image of the original (hereinafter, sometimes referred to as an original image) is read by transporting the original to a reading position 102 with a lead roller pair 1103 (1103a, 1103b).

In the second reading mode, on the occasion of reading the original image as described above, reading accuracy of the image depends on respective positional accuracy of the resist and lead roller pairs 1101 and 1103.

In other words, when the axial line of the nip of the regist roller pair 1101 is at an angle relative to the optical axis, extending in a widthwise direction, i.e., perpendicularly to the moving direction of the reading mover 201, of (the light source 204 of) the reader section 200, skew compensation of the original is unsatisfactory. When the skew compensation of the original is unsatisfactory as described above, the original image is not accurately read. As a result, an image formed on a sheet on the basis of reading information of the original image is skewed as shown in FIG. 8A. Hereinafter, such a problem is called poor skew alignment.

When the axial line of the nip of the lead roller pair 1103 is at an angle relative to the optical axis, the original cannot be transported to the reading position 102 orthogonally relative to the optical axis. In such a case, since the image is not accurately read, an image formed on a sheet on the basis of reading information of the original image is skewed in a widthwise direction as shown in FIG. 8B. Hereinafter, such a problem is called poor orthogonal alignment.

When such a problem, e.g., poor skew alignment occurs, the position of the idle-side regist roller 1101 contacting with the drive-side regist roller 1101a is adjusted as a skew adjustment so that the axial line of the nip of the regist roller pair 1101 agrees with the optical axis of the reader section 200.

When poor orthogonal alignment occurs, by adjusting the position of a hinge (not shown) integrally and rotatably supporting the reader section 200 and the ADF 100 on the far side from the observer in the figure, the position of the ADF 100 relative to the reader section 200 is adjusted as an orthogonal adjustment so that the axial line of the nip of the lead roller pair 1103 agrees with the optical axis.

FIG. 9 is a sectional view of the structure of another example known image-reading apparatus. The image-reading apparatus mainly includes an ADF 600 and a reader section 700. The reader section 700 has a platen glass-plate 702 disposed on the upper surface of a main body 2 of the image-reading apparatus in addition to having a reading mover 701, a light source 704, a first mirror 706, and so forth provided therein. The image-reading apparatus has first and second reading modes. In the first reading mode, an original set by an operator on the platen glass-plate 702 is read by moving the reading mover 701 in an arrow direction indicated in the figure. In the second reading mode, the reading mover 701 is halted at a predetermined position, and an original set on the ADF 600 is read while being transported over the platen glass-plate.

In the second reading mode in which the ADF 600 is used, after skew of the original is corrected by pushing it into contact with a regist roller pair 1601 (1601a and 1601b) and making a loop of the original, an original image is read by transporting the original to a reading position 602 with a transporting belt 603.

On the occasion of reading the original image as described above, reading accuracy of the image mainly depends on the respective positional accuracy of the regist roller pair 1601 and a stretching roller 1604 stretching the transporting belt 603 together with an idle roller 1605.

In other words, when the axial line of the nip of the regist roller pair 1601 is at an angle relative to the optical axis, extending in a widthwise direction, i.e., perpendicularly to the moving direction of the reading mover 701, of (the light source 704 of) the reader section 700, skew compensation of the original is unsatisfactory, resulting in poor skew alignment of the original. When the axial line of the stretching roller 1604 stretching the transporting belt 604 is at an angle relative to the optical axis, the original cannot be orthogonally transported to the reading position 602 relative to the optical axis, resulting in poor orthogonal alignment.

For example, when poor skew alignment occurs, the position of the idle-side regist roller 1601b contacting with the drive-side regist roller 1601a is adjusted as a skew adjustment so that the axial line of the nip of the regist roller pair 1601 agrees with the optical axis of the reader section 700. When poor orthogonal alignment occurs, by adjusting the position of a hinge (not shown) integrally and rotatably supporting the reader section 700 and the ADF 600 on the far side from the observer in the figure, the position of the ADF relative to the reader section 700 is adjusted as an orthogonal adjustment so that the axial line of the stretching roller 1604 agrees with the optical axis.

Mutually independently performing the skew adjustment and the orthogonal adjustment as described above requires much time and increases the number of adjusting steps. In view of this, for example, image-reading apparatuses disclosed in Japanese Patent Laid-Open No. 10-142851 (corresponding to U.S. Pat. No. 6,027,109) have structures in which, by forming a paper-feeding section, a transporting section, and a paper-discharging section of the ADF 100 or 600 as a single unit and by arranging a projection formed on the unit so as to abut against the upper surface of the platen glass-plate of the reading section 200 or 700, the unit is positioned in the vertical direction relative to the reading section 200 or 700 such that the number of adjusting steps needed upon installing the reading section 200 or 700 to the ADF 100 or 600, respectively, is reduced.

Unfortunately, in such known image-reading apparatuses, although the number of steps needed upon installing the ADF 100 or 600 on the corresponding reading section 200 or 700 is reduced, the skew adjustment and the orthogonal adjustment are still needed.

In the case where the unit including the paper-feeding section, the transporting section, and the paper-discharging section is vertically positioned with the projection serving as a positioning section, a variety of original-transporting sections are needed to undergo an alignment adjustment relative to the positioning section. In the case where the frame of the ADF 100 or 600 is deformed, for example, due to use of the apparatus, even when the plurality of original-transporting sections are subjected to the alignment adjustment relative to the positioning section of the unit, the alignment causes the plurality of original-transporting sections to misalign relative to the positioning section of the unit, and no way is prepared for correcting the misalignment. As a result, the original transported by the ADF 100 or 600 is at an angle relative to the optical axis of the reader section 200 or 700, respectively.

An image-reading apparatus disclosed in Japanese Patent Laid-Open No. 08-223362 has a cover capable of opening and closing relative to the main body thereof. The cover has a read roller rotatably provided thereon. The axis of the read roller is positioned in an original-transporting direction with a positioning mechanism provided in the main body of the image-reading apparatus. The read roller positioned by the positioning mechanism is pressed into contact with a contact glass or a contact sensor provided in the main body of the image-reading apparatus. Accordingly, even if the read roller is satisfactorily positioned, when the original is sent to the contact sensor in a state in which it is already skewed at the upstream of the read roller, an image of the original is read in a skewed state. As a result, the image of the original is not accurately read. Hence, an additional adjustment is needed so that the original is sent to the contact sensor without skew.

SUMMARY OF THE INVENTION

The present invention is directed to an image-reading apparatus eliminating a skew adjustment and an orthogonal adjustment upon installing an ADF (an original-transporting section) to a reader section (an image-reading section) and correcting misalignment of an original-transporting mechanism.

In one aspect of the present invention, an imaging apparatus includes an image-reading section configured to read an image of an original; an original-transporting section configured to transport the original to the image-reading section in an original-transporting direction and capable of opening and closing relative to the image-reading section; a light source provided in the image-reading section and configured to illuminate light onto the original, the light source extending in a direction intersecting with the original-transporting direction; an original-transporting rotor configured to transport the original to the image-reading section after correcting skew of the original by making a loop of the original and supported by the original-transporting section so as to make a variable angle with the light source; and position-regulating members provided in the image-reading section and configured to position the original-transporting rotor when the original-transporting section is closed. When the original-transporting section is closed, the original-transporting rotor is positioned by the position regulating members such that an angle made by the original-transporting rotor and the light source is variable.

Further features of the present invention will become apparent from the following description of exemplary embodiments with reference to the attached drawings.

DESCRIPTION OF THE EMBODIMENTS

Exemplary embodiments of the present invention will be described in detail with reference to the attached drawings.

First Embodiment

Figure 1:
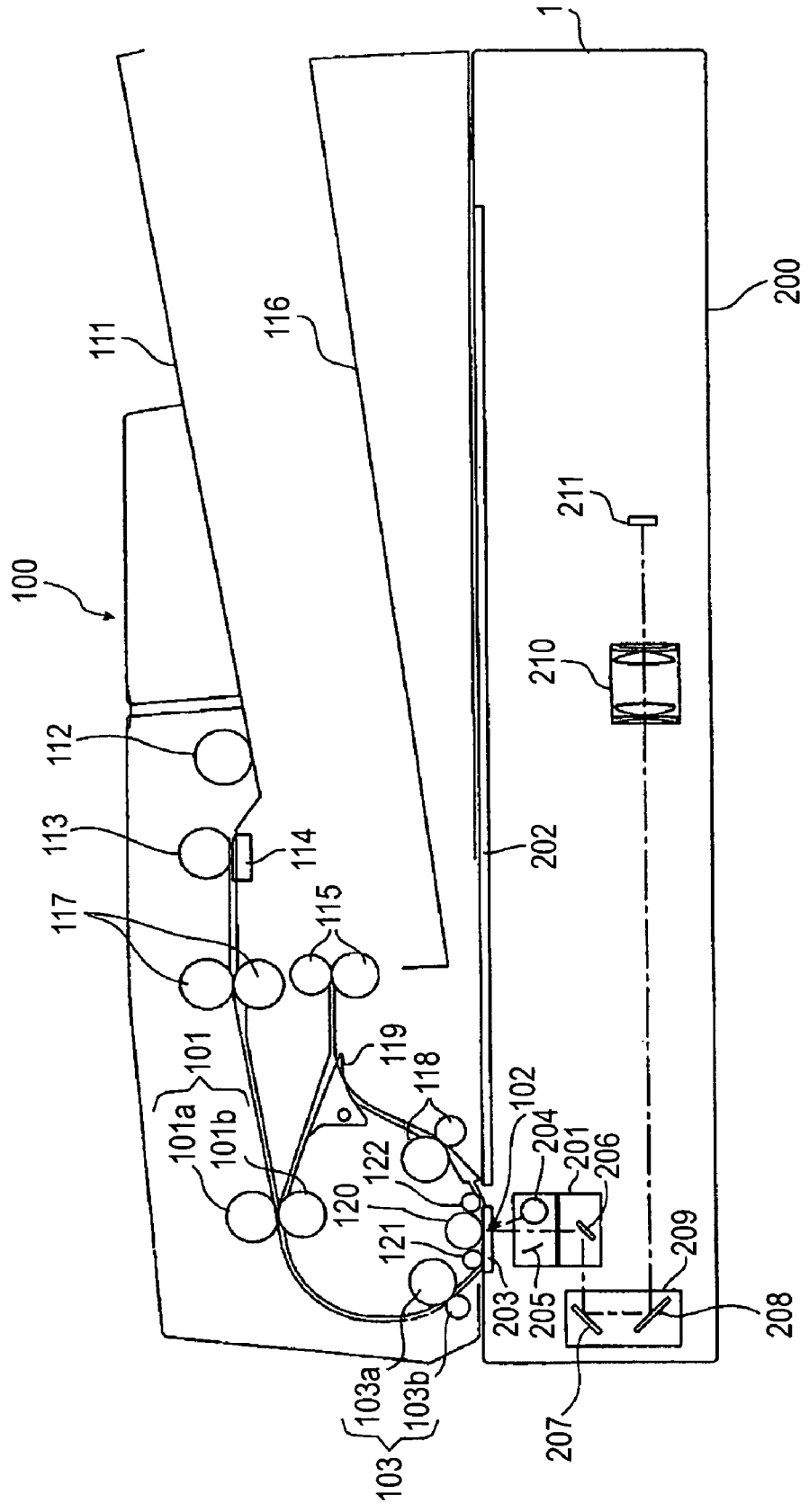
FIG. 1 is a sectional view of the structure of an image-reading apparatus according to a first embodiment of the present invention.
Figure 7:
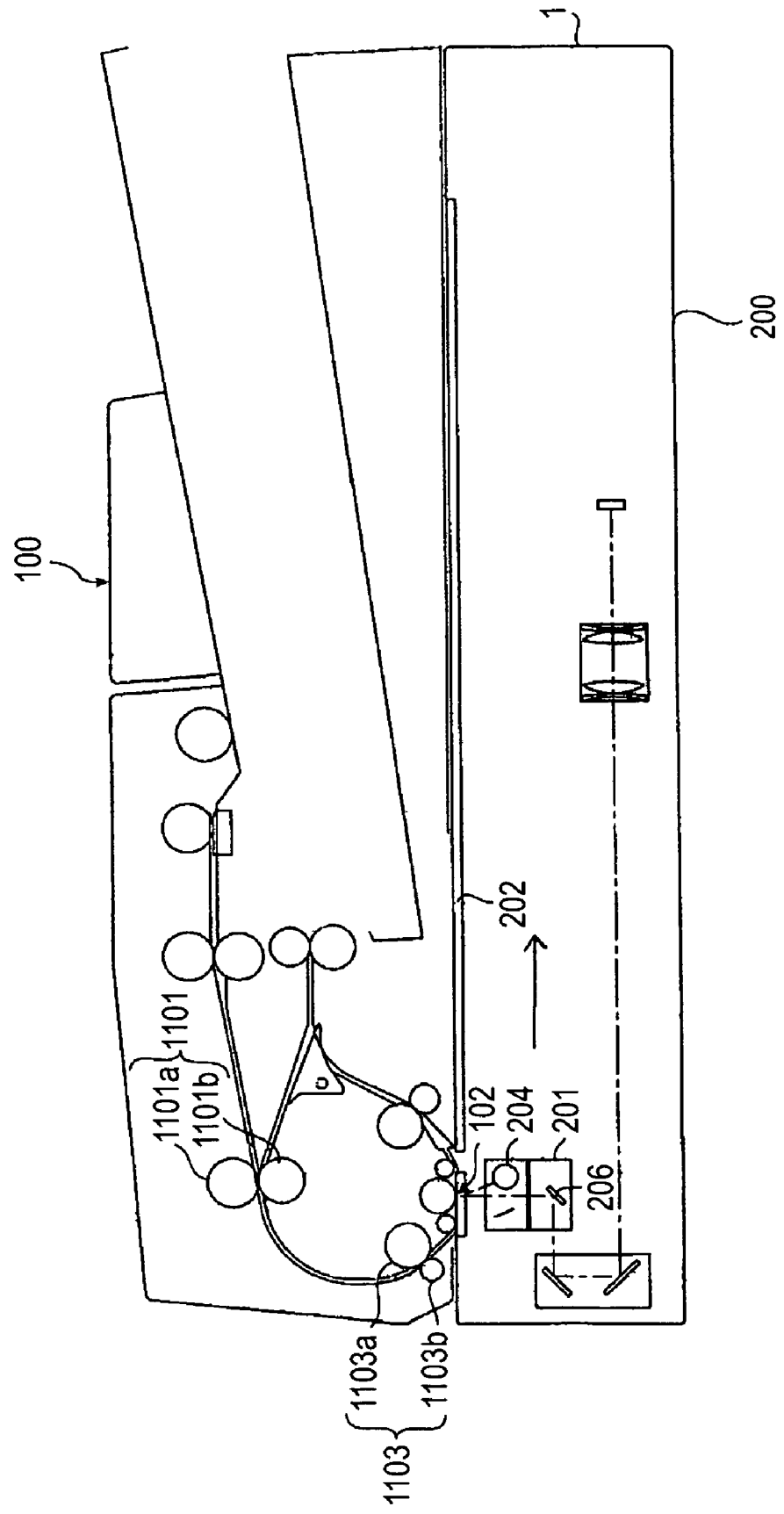
FIG. 7 is a sectional view of the structure of an example known image-reading apparatus.

FIG. 1 is a sectional view of the structure of an image-reading apparatus according to a first embodiment of the present invention. The same reference numbers in FIG. 1 as those in FIG. 7 denote the same parts as or parts equivalent to those in FIG. 7.

As shown in FIG. 1, an automatic document feeder (ADF) 100 serving as an original-transporting section has a paper-feeding tray 111 provided in the upper part thereof, serving as an original-placing table. In a second mode of reading an original set on the ADF 100 while transporting it over a platen glass-plate, originals on the paper-feeding tray 111 are delivered out in order from the uppermost one with a paper-feeding roller 112 serving as a feeding mechanism and then separated sheet by sheet with a separating-transporting roller 113 and a separating pad 114 serving as a separating mechanism.

The original separated as described above is transported with a transporting-roller pair 117 and a regist roller pair 101 and subjected to correction of skew by making a loop of the original by pushing its front end into contact with the nip of a lead roller pair 103 (103a and 103b) serving as an example original-transporting rotor. In other words, skew of the original is corrected by making a loop of the original by pushing the front end of the original into contact with the halted lead roller pair 103. Upon completing the correction of skew of the original, rotation of the lead roller pair 103 allows the original to be transported to a reading position 102 and pass above a reading mover 201 halted at a predetermined position below the reading position 102.

A reader section 200 constituting an image-reading section for reading an original image by illuminating light onto the original is configured to optically read image information recorded on the original by illuminating light onto the target original and input it therein as image data after applying an electrooptical conversion on it. The reader section 200 includes the reading mover 201 including a concave reflector 205, a light source 204, a first mirror 206, and so forth, platen glass-plates 202 and 203, a mirror unit 209 including scanning mirrors 207 and 208, a lens unit 210, and a CCD sensor 211. The light source 204 extends in a direction perpendicular to the transporting direction of the original and is hereinafter sometimes called an optical axis of the reader section 200.

Upon passing above the reading mover 201 of the reader section 200 having the structure as described above, the original is illuminated by the light source 204 of the reading mover 201. When passing through the lens unit 210 via the scanning mirrors 207 and 208 and forming an image on the CCD sensor 211, the reflected light of the original is converted into an electrical signal. The light source 204, the scanning mirrors 207 and 208, the lens unit 210, and the CCD sensor 211 of the reading mover 201 constitute a reading unit for reading an image of the original. The optical axis of the light source 204 extends along the main scanning direction of the reading unit.

When the image is read as described above, the original is discharged onto a paper-discharging tray 116 with a downstream lead-roller pair 118 and a paper-discharging roller pair 115. In the case of reading both sides of the original, one image on the upper surface (one surface) of the original is first read at the reading position 102. After the rear end of the original passes through a flapper 119, the original is flipped by driving in reverse the paper-discharging roller pair 115 and re-transported to the regist roller pair 101 and to the reading position 102 so that the other image on the rear surface (the other surface) of the original is read. Subsequently, the original is flipped again by the paper-discharging roller pair 115 so as to maintain its original direction and discharged onto the paper-discharging tray 116 after passing above the reading position 102.

As shown in FIG. 1, a platen roller 120 and rollers 121 and 122 for stabilizing transportation of the original at the reading position 102 are provided at the reading position 102 so as to have respectively predetermined gaps relative to the platen glass-plate 203.

Figure 2:
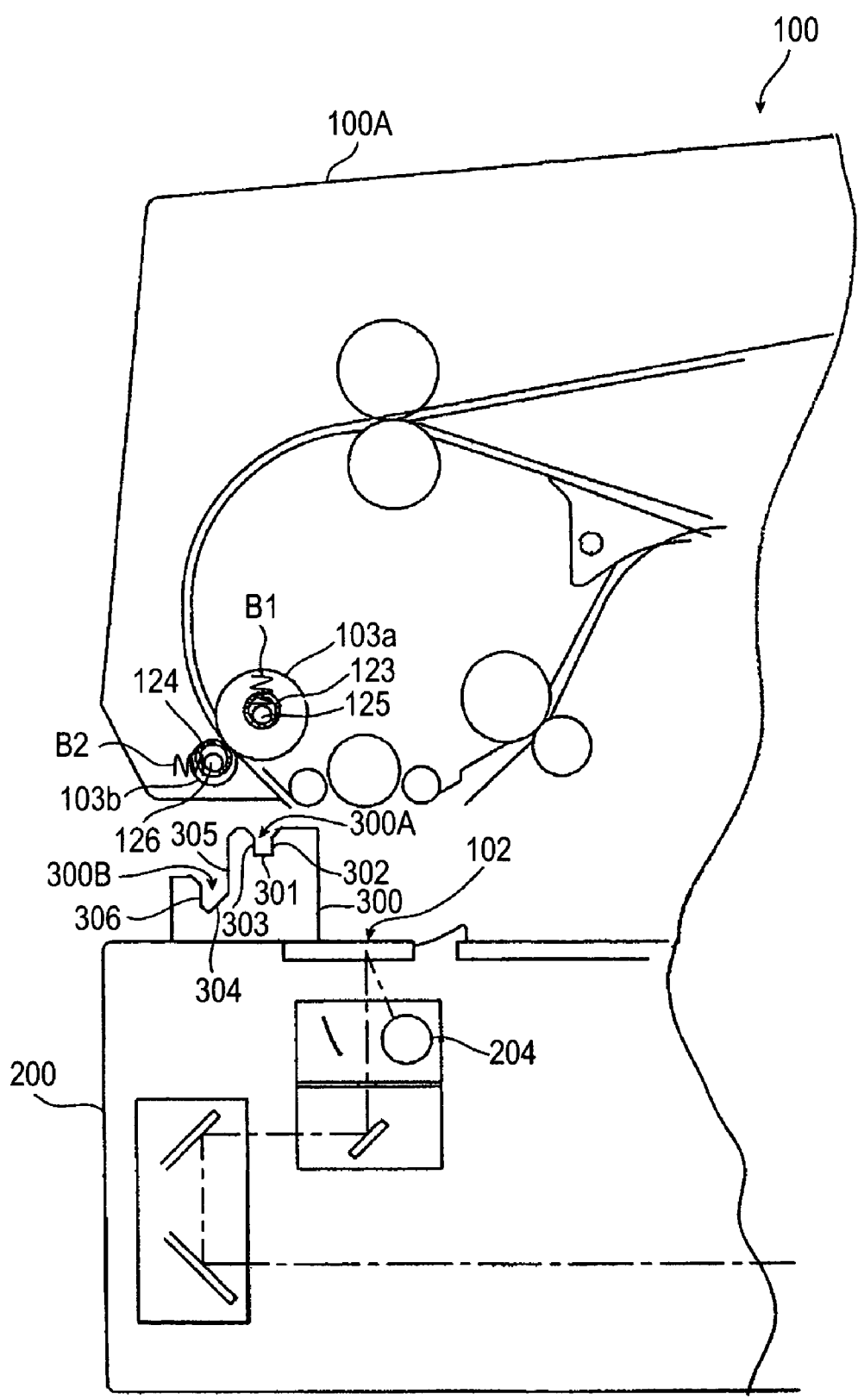
FIG. 2 is a first diagram illustrating a mechanism disposed in an ADF of the image-reading apparatus, for positioning lead rollers.
Figure 3:
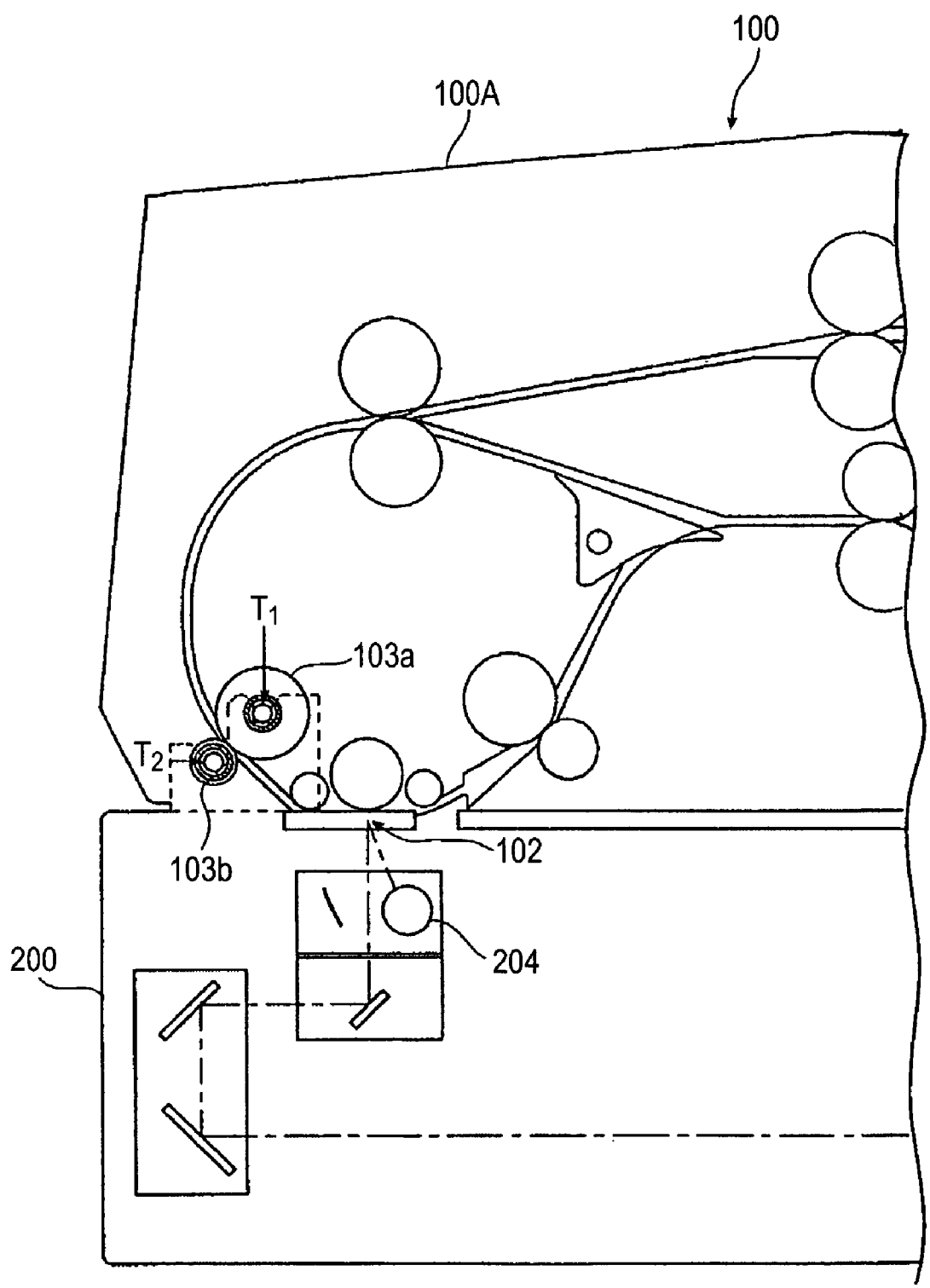
FIG. 3 is a second diagram illustrating the mechanism disposed in the ADF of the image-reading apparatus, for positioning the lead rollers.

Referring now to FIGS. 2 and 3, an essential part of the structure of the image-reading apparatus for positioning the lead roller pair 103 will be described.

The upper lead roller 103a is rotatably supported by the ADF main body 100A by inserting a cored bar 125 serving as a shaft of the upper lead roller 103a constituting the lead roller pair 103 into a ring-shaped receiving section 123 serving as a supporting member and provided in a main body 100A of the ADF 100 (hereinafter, referred to as an ADF main body) constituting the original-transporting section and being capable of opening and closing relative to the reader section 200.

Since the internal diameter of the receiving section 123 is set greater than the external diameter of the cored bar 125, the upper lead roller 103a is movably held by the ADF main body 100A in the radial direction of the cored bar 125, having the cored bar 125 and the receiving section 123 interposed therebetween. The cored bar 125 is subjected to a downward urging force T1 with a first spring B1 serving as an urging mechanism. With this, (the cored bar 125 of) the upper lead roller 103a is normally pressed against the lowermost surface of the receiving section 123.

Whereas, the lower lead roller 103b constituting the lead roller pair 103 together with the upper lead roller 103a is rotatably supported by the ADF main body 100A by inserting a cored bar 126 serving as the shaft of the lower lead roller 103b into a ring-shaped receiving section 124 provided in the ADF main body 100A and serving as a supporting member. Since the internal diameter of the receiving section 124 is set greater than the external diameter of the cored bar 126, the lower lead roller 103b is movably held by the ADF main body 100A in the radial direction of the cored bar 126, having the cored bar 126 and the receiving section 124 interposed therebetween.

The cored bar 126 is subjected to an urging force T2 with a second spring B2 serving as an urging mechanism in a direction toward the upper lead roller 103a. With this, the lower lead roller 103b is normally pressed into contact with the upper lead roller 103a. The cored bars 125 and 126 and the receiving sections 123 and 124 of the upper and lower lead rollers 103a and 103b are provided near to and far from the observer in the figure in the same manner as each other.

As described above, the upper lead roller 103a or the lower lead roller 103b is radially movable relative to the ADF main body 100A in the radial direction of the receiving section 123 or 124 by an amount of a radial clearance of the receiving section 123 or 124 relative to the cored bar 125 or 126, respectively.

The urging force T1 exerted on the cored bar 125 of the upper lead roller 103a is set so as to be greater than the urging force T2 exerted on the cored bar 126 of the lower lead roller 103b. With this arrangement, in an opened state of the ADF 100 relative to the reader section 200 shown in FIG. 2, the cored bar 125 of the upper lead roller 103a is located at the lower part of the receiving section 123 of the same, and the lower lead roller 103b abuts against the upper lead roller 103a.

Positioning members 300 shown in FIG. 2, each disposed on the upper surface of the reader section 200 and serving as a position-regulating member, are provided near to and far from the observer in the figure so as to face each other and configured to position the lead roller pair 103 in the transporting direction in the reader section.

The positioning member 300 includes a receiving section 301 configured to receive the cored bar 125 of the upper lead roller 103a, a first positioning section 300A including regulating sections 302 and 303 configured to regulate the horizontal movement of the cored bar 125, a receiving section 304 configured to receive the cored bar 126 of the lower lead roller 103b, and a second positioning section 300B including wall surfaces 305 and 306 formed at positions where the lower lead roller 103b is not prevented from moving in a direction of abutting against the upper lead roller 103a, when the ADF 100 is closed relative to the feeder section 200.

With the positioning member 300 having the above structure, when the ADF 100 is closed relative to the reader section 200 shown in FIG. 3, the upper and lower lead rollers 103a and 103b are positioned.

More particularly, the upper lead roller 103a is positioned such that the cored bar 125 is vertically pressed downwards and pushed into contact with the receiving section 301 with the urging force T1, and its horizontal movement is regulated with the regulating sections 302 and 303. In a known image-reading apparatus disclosed in Japanese Patent Laid-Open No. 10-142851 and having a structure in which a transporting unit of an ADF is positioned relative to a reader section by pushing a projection formed in the transporting unit into contact with the upper surface of a platen glass-plate, although positioned relative to each other in the vertical direction, the reader section and the transporting unit are not positioned so as to prevent an original to be transported from poor skew alignment or poor orthogonal alignment relative to the reader section.

On the contrary, according to the present embodiment, since the movement of the cored bar 125 in the horizontal direction (a direction along a plane lying substantially parallel to the upper surface of the platen glass-plate 203 and perpendicular to the shaft of the cored bar 125) is regulated by the regulating sections 302 and 303, the optical axis of the light source 204 and the shaft of the upper lead roller 103a are parallel to each other, thereby preventing the poor orthogonal alignment.

The lower lead roller 103b is also positioned with the second positioning section 300B having the same structure as that of the first positioning section 300A. With this, the optical axis of the light source 204 and the nip line of the lead roller pair 103 are parallel to each other, that is, the main scanning direction of the reading unit and the axis of the lead roller pair 103 are parallel to each other. As a result, the original transported by the lead roller pair 103 is prevented from declination (skew) relative to the light source 204 (the main scanning direction). Since the urging force T2 urges the cored bar 126 to abut against the receiving section 304 and the upper lead roller 103a, the lower lead roller 103b is positioned.

Since the urging force T1 is set greater than the urging force T2 as described above, even when pushed by the lower lead roller 103b, the upper lead roller 103a does not move.

According to the present embodiment, the positioning member 300 is positioned relative to the optical axis of the reader section 200 so that its position is adjustable relative to the reader section 200. Thus, the position is adjustable relative to the optical axis determined on the basis of an optical adjustment performed in the reader section.

Figure 8A:
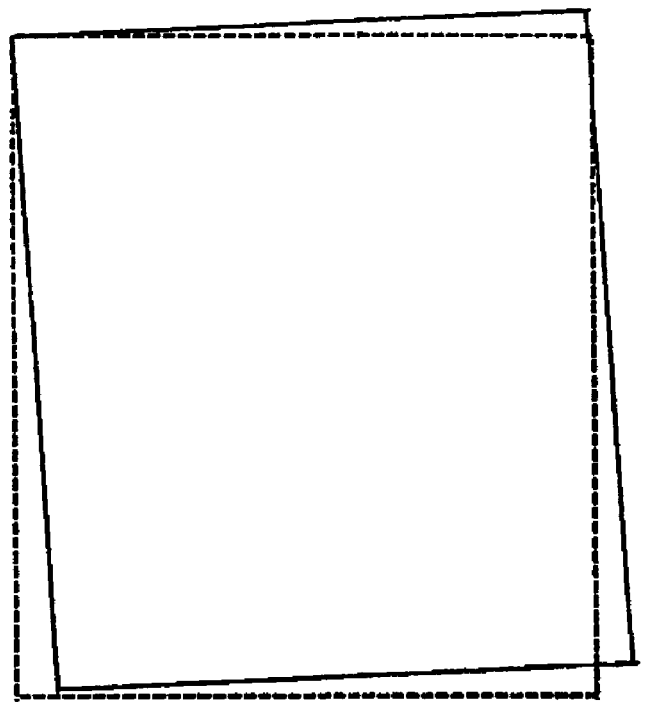
FIGS. 8A and 8B are diagrams illustrating problems caused by the known image-reading apparatus.
Figure 8B:
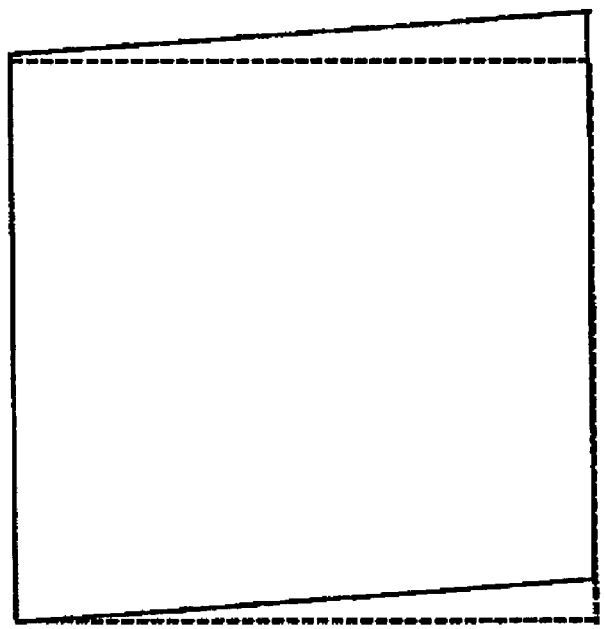

In the case where the lead roller pair 103 transporting the original at the reading position 102 is positioned by the positioning members 300 positioned relative to the optical axis of the reader section 200 as described above, even when no additional adjusting step for installing the ADF 100 to the reader section 200 is prepared, by adjusting the position of the positioning member 300 as needed in response to occurrence of a poor image, for example, as shown in FIG. 8B, a poor orthogonal alignment due to misalignment of the lead roller pair 103 relative to the optical axis of the reader section 200 is prevented.

Even in the case where the lead roller pair 103 serves also as a skew-compensating mechanism as in the present embodiment in which the register of the original is established by pushing the front of the original into contact with the nip of the lead roller pair 103 so as to form a loop, even when no additional adjusting step for installing the ADF 100 to the reader section 200 is prepared, by adjusting the position of the positioning member 300 as needed in response to occurrence of a poor image (e.g., as shown in the foregoing FIG. 8A), a poor skew alignment due to misalignment of the reader section 200 relative to the optical axis of the reader section 200 is prevented.

Even in the case where the positions of the upper and lower lead rollers 103a and 103b of the lead roller pair 103 are shifted in the ADF main body caused by deformation of the frame (not shown) of the ADF main body 100A due to, e.g., deterioration in opening and closing durability of the ADF 100, when the ADF 100 is closed relative to the reader section 200, the upper and lower lead rollers 103a and 103b are positioned relative not to the ADF 100 but to the positioning member 300 of the reader section 200, thereby preventing occurrence of a poor orthogonal alignment and a skew alignment.

As described above, the lead roller pair 103 is provided in the ADF 100 capable of opening and closing relative to the reader section 200 so as to make a variable angle with the light source (the optical axis). When the ADF 100 is closed relative to the reader section 200, the lead roller pair 103 is positioned by the positioning member 300 provided on the reader section 200, and the positioning member 300 is movable so as to make a variable angle with the light source so that an angle made by the lead roller pair 103 and the light source is adjustable with the positioning member 300. Hence, the lead roller pair 103 is positioned relative not to the ADF 100 but to the positioning member 300 of the reader section 200. With this arrangement, skew arrangement and orthogonal arrangement operations upon installing the ADF 100 to the reader section 200 are eliminated. Also, misalignment of the ADF 100 is corrected.

The original-transporting section capable of opening and closing relative to the image-reading section has the original-transporting rotor transporting the original to the image-reading section provided therein so as to make a variable angle with the light source. When the original-transporting section is closed, an original-transporting mechanism (i.e., the lead roller pair) is positioned by a position-regulating member (i.e., the positioning member) disposed in the image-reading section. As a result, skew arrangement and orthogonal arrangement operations upon installing the original-transporting section to the image-reading section are eliminated. Also, misalignment of the original-transporting mechanism is corrected.

Figure 4:
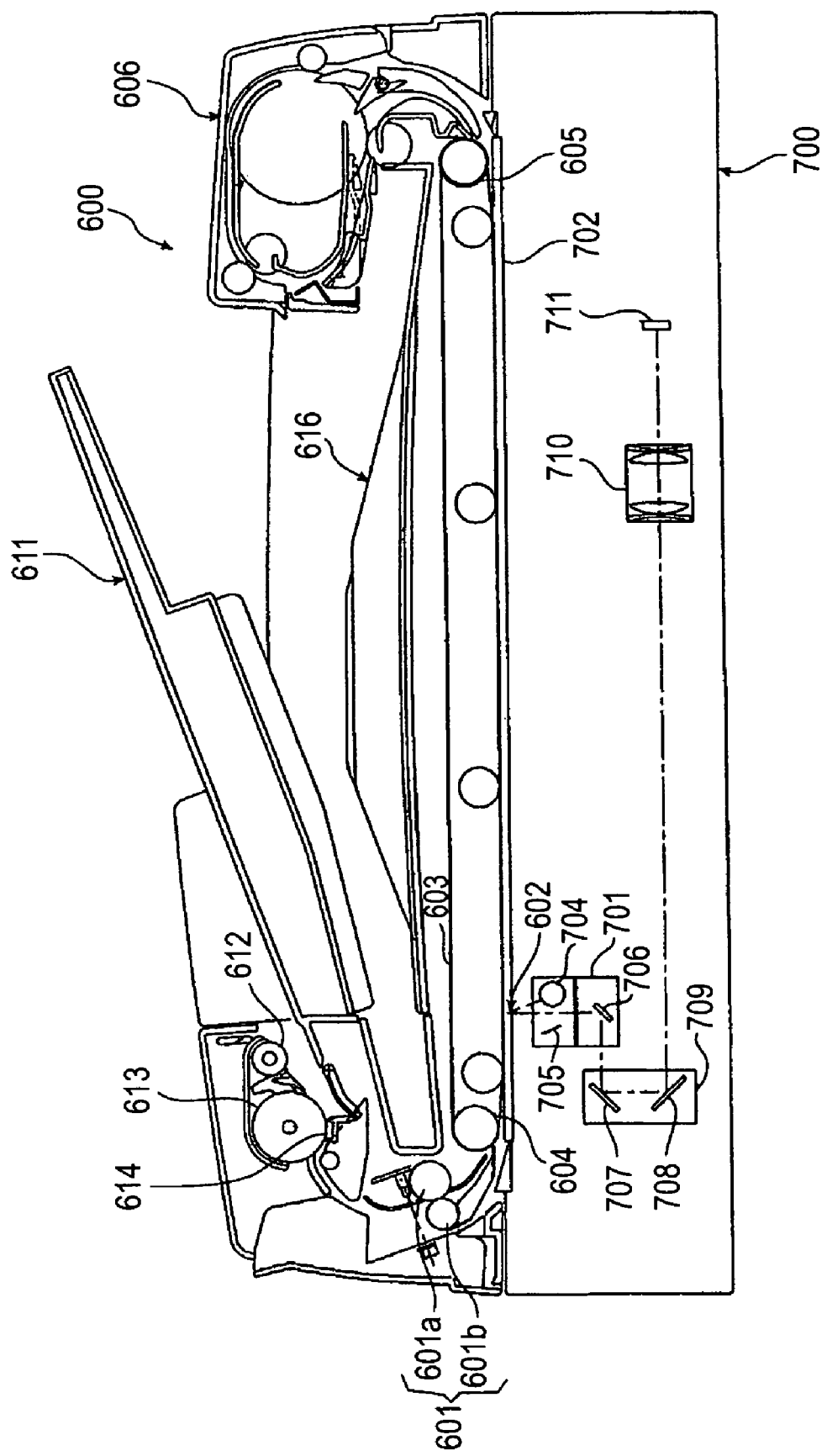
FIG. 4 is a sectional view of the structure of an image-reading apparatus according to a second embodiment of the present invention.
Figure 9:
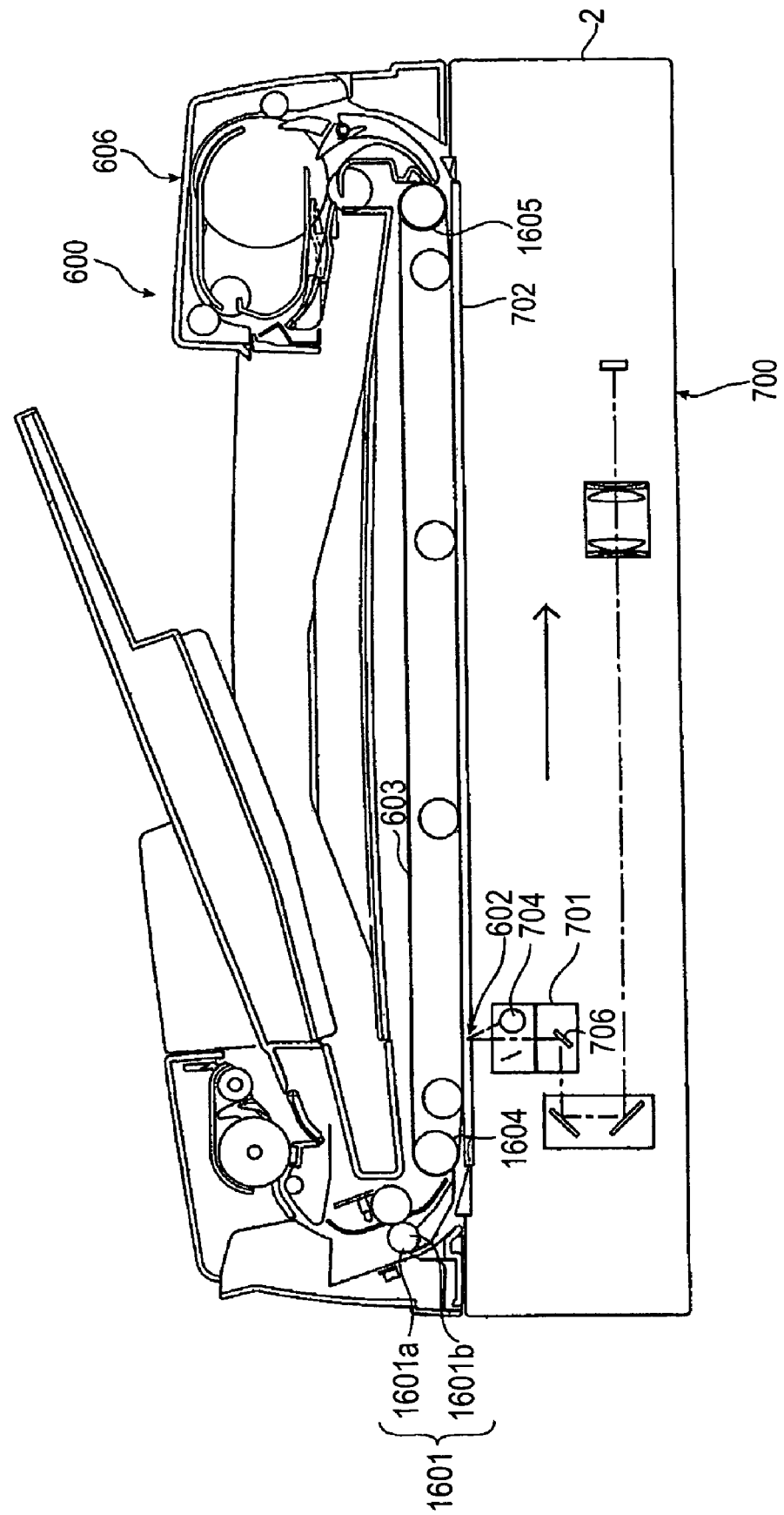
FIG. 9 is a sectional view of the structure of another example known image-reading apparatus.

A second embodiment of the present invention will be described. FIG. 4 is a sectional view of the structure of an image-reading apparatus according to the second embodiment of the present invention. The same reference numbers in FIG. 4 as those in FIG. 9 denote the same parts as or parts equivalent to those in FIG. 9.

As shown in FIG. 4, an automatic document feeder (ADF) 600 has a paper-feeding tray 611 provided in the upper part thereof, serving as an original-placing table. In a second mode of reading an original set on the ADF 600 while transporting over a platen glass-plate, originals on the paper-feeding tray 611 are delivered out in order from the uppermost one with a paper-feeding roller 612 serving as a feeding mechanism and then separated sheet by sheet with a separating-transporting roller 613 and a separating pad 614 serving as a separating mechanism.

The front of the original separated as described above is transported with a transporting-roller pair 601. The original transported by the transporting-roller pair 601 is transported to a reading position 602 by a transporting belt 603 serving as an endless belt member and also as an original-transporting mechanism, which is stretched by an idle roller 605 and a driving roller 604, and passes above a reading mover 701 halted at a predetermined position below the reading position 602.

A reader section 700 is configured to optically read image information recorded on a reading target (e.g. an original) and apply an electrooptical conversion to it so as to input it therein as image data. The reader section 700 includes the reading mover 701 including a concave reflector 705, a light source 704, a first mirror 706, and so forth, a platen glass-plate 702, a mirror unit 709 including scanning mirrors 707 and 708, a lens unit 710, and a CCD sensor 711.

Upon passing above the reading mover 701 of the reader section 700 having the above-described structure, the original is illuminated by the light source 704 of the reading mover 701. When the light illuminating the original passes through the lens unit 710 via the scanning mirrors 707 and 708 and forms an image on the CCD sensor 711, the reflected light of the original is converted into an electrical signal. When the image of the original is read as described above, the original is transported by the transporting belt 603 and then discharged onto a paper-discharging tray 616 with a paper-discharging-and-reversing section 606.

In the case of reading both sides of the original, the original whose image on the upper surface (one surface) has been read at the reading position 602 is flipped by the paper-discharging-and-reversing section 606 with respect to the front and rear surfaces thereof and subsequently transported again to the reading position 602. When the other image is read at the reading position 602, the original is discharged onto the paper-discharging tray 616 by the paper-discharging-and-reversing section 606.

Figure 5:
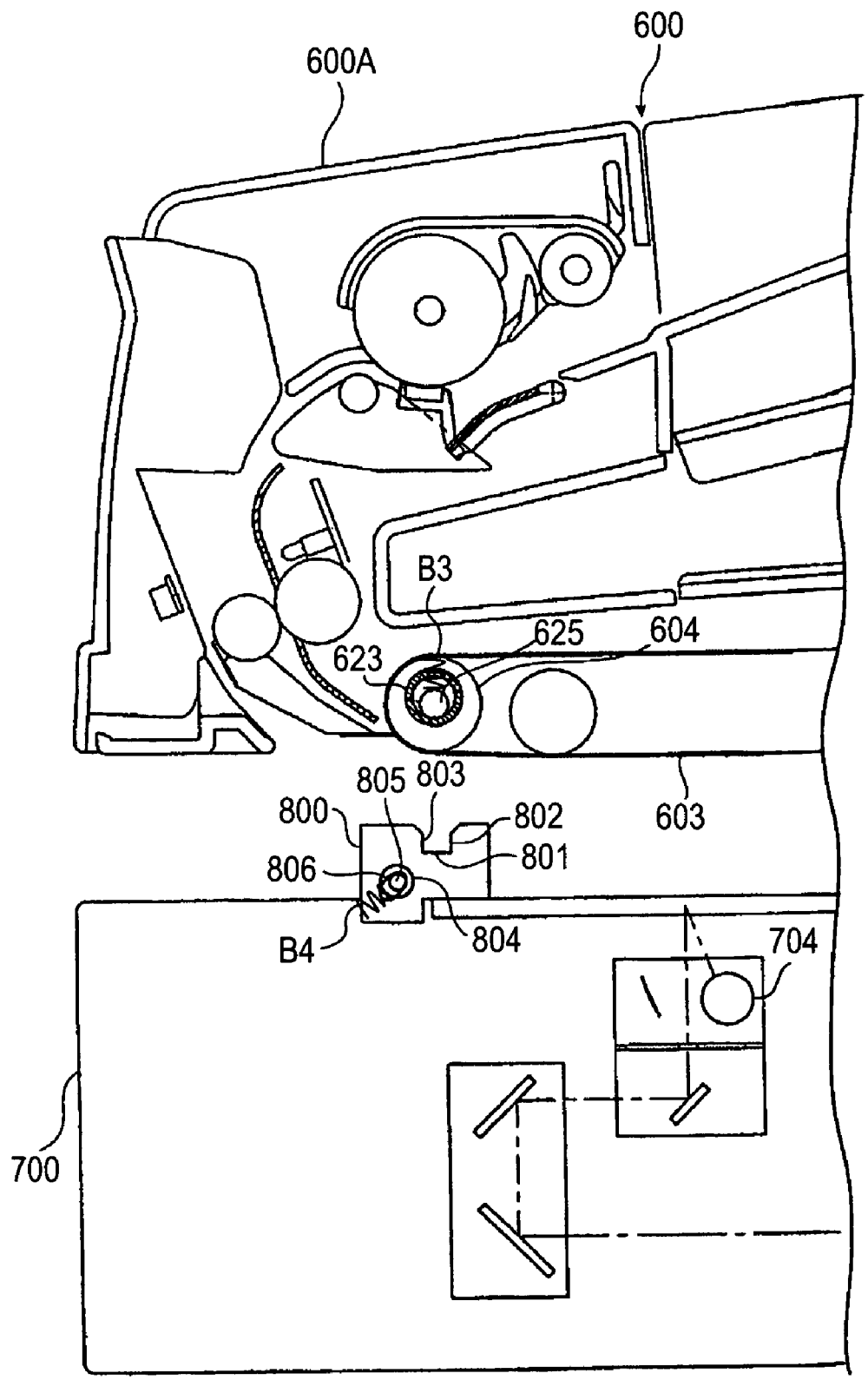
FIG. 5 is a sectional view of an essential part of the image-reading apparatus according to the second embodiment.
Figure 6:
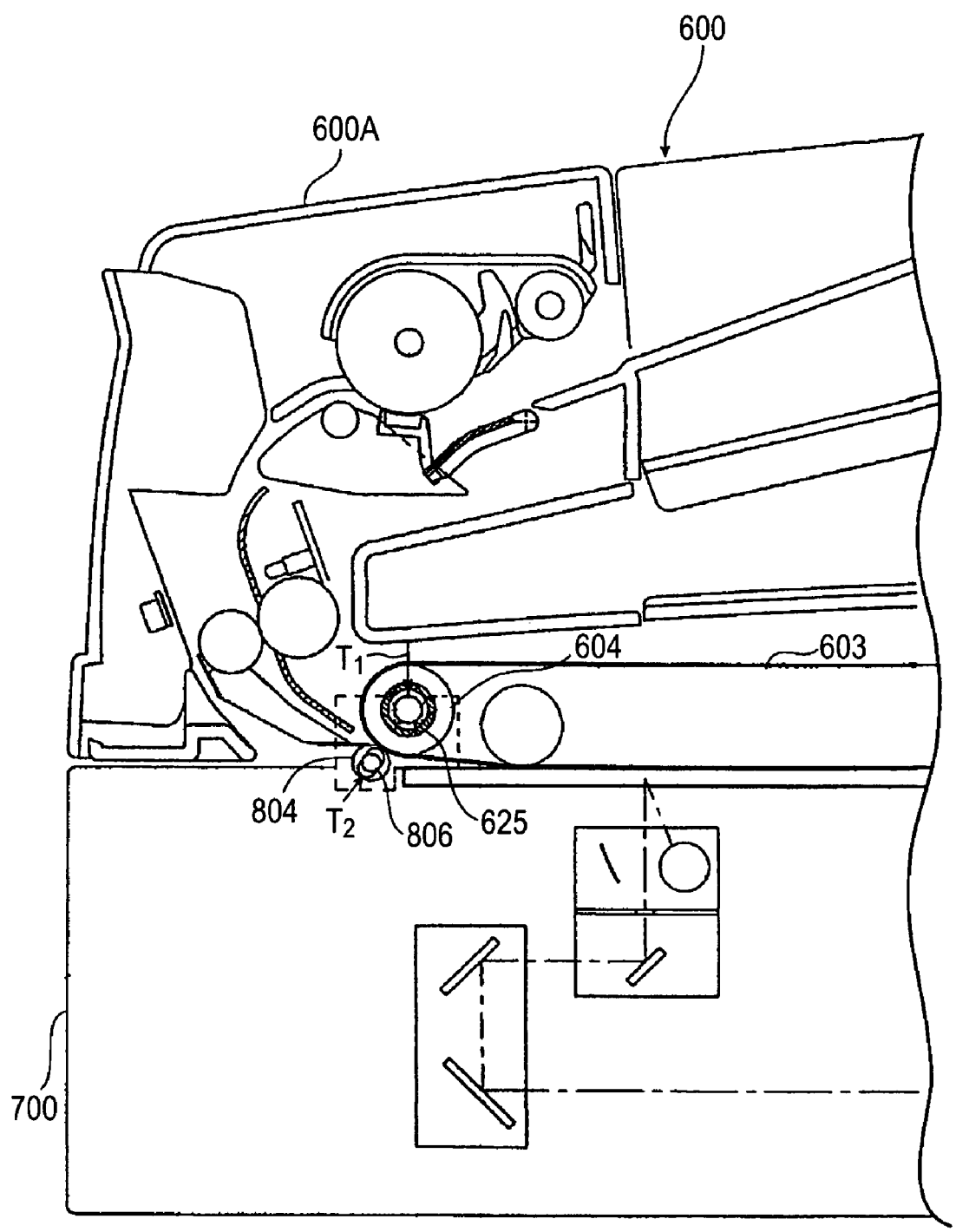
FIG. 6 is a first diagram illustrating a mechanism disposed on an ADF of the image-reading apparatus according to the second embodiment, for positioning a driving roller having a transporting belt stretching thereover and a belt-abutment roller abutting against the driving roller.

Referring now to FIGS. 5 and 6, an essential part of the structure of the image-reading apparatus for positioning the driving roller 604 serving as an original-transporting rotor and stretching the transporting belt 603 will be described.

By inserting a cored bar 625 serving as a shaft of the driving roller 604 into a ring-shaped receiving section 623 provided in an ADF main body 600A, the driving roller 604 is rotatably held by the ADF main body 600A. Since the internal diameter of the receiving section 623 is set greater than the external diameter of the cored bar 625, the driving roller 604 is movably held in the ADF main body 600A in the radial direction of the cored bar 625 with the cored bar 625 and the receiving section 623.

The cored bar 625 is subjected to a downward urging force T1 with a spring B3 serving as an urging mechanism. With this, (the cored bar 625 of) the driving roller 604 is normally pressed against the lowermost surface of the receiving section 623. The cored bar 625 and the receiving section 623 of the driving roller 604 are provided near to and likewise far from the observer in the figure.

With this structure, the driving roller 604 is radially movable relative to the ADF main body 600A by an amount of a radial clearance of the receiving section 623 relative to the cored bar 625. In a state in which the ADF 600 is opened relative to the reader section 700 shown in FIG. 5, the cored bar 625 is located at the lowermost surface of the receiving section 623.

Positioning members 800 shown in FIG. 5, each disposed on the upper surface of the reader section 700, are provided near to and far from the observer in the figure so as to face each other.

Each of the positioning members 800 includes a receiving surface 801 configured to receive the cored bar 625 of the driving roller 604 when the ADF 600 is closed and regulating sections 802 and 803 configured to regulate the horizontal movement of the cored bar 625 also when the ADF 600 is closed.

As shown in FIG. 5, the reader section 700 has a belt-abutment roller 804 provided therein, serving as another roller member abutting against the driving roller 604 having the transporting belt 603 interposed therebetween. Other than the receiving surface 801 configured to receive the cored bar 625 of the driving roller 604 and the regulating sections 802 and 803 configured to regulate the horizontal movement of the cored bar 625 when the ADF 600 is closed relative to the reader section 700 as described above, the reader section 700 has the positioning members 800 provided therein, each having a long-narrow-bore section 806 configured to receive a cored bar 805 serving as a shaft of the belt-abutment roller 804. The positioning members 800 are provided near to and far from the observer in the figure so as to face each other.

The cored bar 805 of the belt-abutment roller 804 is movably supported in the radial direction thereof by the long-narrow-bore receiving section 806 formed in the corresponding one of the positioning members 800 provided near to and far from the observer in the figure and having the same shape as each other and is urged towards the driving roller 604, in concrete terms, in the upward direction of the long narrow bore by an urging force T2 of an urging spring B4.

Since the urging force T1 against the cored bar 625 of the driving roller 604 is set greater than the urging force T2, when the ADF 600 is opened relative to the reader section 700 shown in FIG. 5, in a state in which the cored bar 625 of the driving roller 604 is located at the lower part of the receiving section 623 and the cored bar 805 of the belt-abutment roller 804 is located at the upper part of the long-narrow-bore receiving section 806, the driving roller 604 and the belt-abutment roller 804 abut against (press into contact with) each other, having the transporting belt 603 interposed therebetween.

With the positioning members 800 having the above structure, when the ADF 600 is closed relative to the reader section 700 shown in FIG. 6, the driving roller 604 and the belt-abutment roller 804 are positioned.

More particularly, the driving roller 604 is positioned such that the cored bar 625 is vertically pressed and pushed into contact with the receiving section 801 with the urging force T1, and its horizontal movement is regulated with the regulating sections 802 and 803. The belt-abutment roller 804 is positioned such that the cored bar 805 moves along the long-narrow-bore receiving section 806 and abuts against the driving roller 604 with the urging force T2, having the transporting belt 603 interposed therebetween.

As described above, since the urging force T1 urging the cored bar 625 of the driving roller 604 is set greater than the urging force T2 urging the cored bar 805 of the belt-abutment roller 804, even when the driving roller 604 is pushed by the belt-abutment roller 804, the driving roller 604 does not move.

According to the present embodiment, by bringing the belt-abutment roller 804 into contact with the driving roller 604 having the transporting belt 603 interposed therebetween as described above, and also, by pushing the front end of the original into contact with the nip between the driving roller 604 and the belt-abutment roller 804 so as to make a loop of the original prior to entering the reading position 602, skew of the front end of the original is corrected and register of the original is established. In other words, by pushing the front end of the original into the nip between the halted driving roller 604 and the belt-abutment roller 804 so as to make a loop of the original, the skew of the original is corrected. With such a structure, the transporting-roller pair 601 functions as normal transporting rollers.

Also, according to the present embodiment, the position of the positioning member 800 is adjustable relative to the reader section 700 and thus adjustable relative to the optical axis determined on the basis of an optical adjustment performed in the reader section.

Hence, even in the case where the driving roller 604 and the belt-abutment roller 804 serve also as a skew-compensating mechanism as in the present embodiment, even when no additional adjusting step for installing the ADF 600 to the reader section 700 is prepared, by adjusting the position of the positioning member 800 in response to occurrence of a poor image, for example, as shown in FIG. 8A, a poor skew alignment due to misalignment of the positioning member 800 relative to the optical axis of the reader section 700 is prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-360507 filed Dec. 13, 2004, which is hereby incorporated by reference herein in its entirety.

What is claimed is:

1. An image-reading apparatus, comprising:
   an image-reading section configured to read an image of an original;
   an original-transporting section configured to transport the original to the image-reading section in an original-transporting direction and capable of opening and closing relative to the image-reading section;
   a light source provided in the image-reading section and configured to illuminate light onto the original, the light source extending in a direction intersecting with the original-transporting direction;
   an original-transporting rotor configured to transport the original to the image-reading section after correcting skew of the original by making a loop of the original, the rotor being supported by the original-transporting section so as to make a variable angle with the light source; and
   position-regulating members provided in the image-reading section and configured to position the original-transporting rotor when the original-transporting section is closed,
   wherein, when the original-transporting section is closed, the position-regulating members positions the original-transporting rotor such that the angle made by the original-transporting rotor and the light source is variable.

2. The image-reading apparatus according to claim 1, wherein the position-regulating members are movably provided in the image-reading section such that the angle made by the original-transporting rotor and the light source is variable with the position-regulating members.

3. The image-reading apparatus according to claim 1, wherein the original-transporting rotor is a roller pair having shafts, and wherein when the original-transporting section is closed, the position-regulating members position the corresponding shafts of the roller pair.

4. The image-reading apparatus according to claim 3, wherein the original-transporting section includes supporting members provided therein and supporting the shafts of the roller pair so as to be movable in a radial direction of the corresponding shafts.

5. The image-reading apparatus according to claim 1, further comprising an endless belt stretched over the original-transporting rotor, wherein the position-regulating members position corresponding shafts of the original-transporting rotor.

6. The image-reading apparatus according to claim 5, wherein the original-transporting section includes supporting members supporting the corresponding shafts of the original-transporting rotor so as to be movable in a radial direction of the corresponding shafts.

7. The image-reading apparatus according to claim 6, wherein the image-reading section includes a roller member supported such that, when the original-transporting section is closed, the roller member is pressed into contact with the original-transporting rotor having the endless belt interposed therebetween and defining a variable angle with the light source.

8. An image-reading apparatus, comprising:
   an image-reading section configured to read an image of an original at a reading position;
   an original-transporting section configured to transport the original to the reading position and capable of opening and closing relative to image-reading section;
   an original-transporting member provided in the original-transporting section and configured to transport the original to the reading position after correcting skew of the original by making a loop of the original, the original-transporting member supported by the original-transporting section so as to make a variable angle with a main scanning direction of the image-reading section; and
   position-regulating members provided in the image-reading section and configured to position the original-transporting section such that, when the original-transporting section is closed, an angle defined by an original-transporting direction of the original-transporting member and the main scanning direction of the image-reading section is adjustable.

* * * * *